United States Patent [19]

Tsuzuki et al.

[11] Patent Number: 5,394,015
[45] Date of Patent: Feb. 28, 1995

[54] METHOD OF PRODUCING SINTERED SILICON NITRIDES

[75] Inventors: Yasushi Tsuzuki; Tomoyuki Awazu; Akira Yamakawa, all of Itami, Japan

[73] Assignee: Sumitomo Electric Industries, Ltd., Osaka, Japan

[21] Appl. No.: 91,192

[22] Filed: Jul. 14, 1993

[30] Foreign Application Priority Data

Jul. 17, 1992 [JP] Japan .................. 4-213386
Apr. 6, 1993 [JP] Japan .................. 5-103662

[51] Int. Cl.$^6$ .......................... C04B 35/58
[52] U.S. Cl. ........................ 264/65; 264/66; 501/97; 501/98
[58] Field of Search ............ 264/65, 66; 501/97, 501/98

[56] References Cited

U.S. PATENT DOCUMENTS

| | | | |
|---|---|---|---|
| 3,950,464 | 4/1976 | Masaki | 264/65 |
| 4,327,187 | 4/1982 | Komatsu et al. | 501/98 |
| 4,624,808 | 11/1986 | Lange | 264/56 |

FOREIGN PATENT DOCUMENTS 59-131579  7/1984  Japan.
4-77363   3/1992  Japan.

*Primary Examiner*—James Derrington
*Attorney, Agent, or Firm*—Wenderoth, Lind & Ponack

[57] ABSTRACT

The invention provides a method of producing sintered silicon nitrides having such strength characteristics as are sufficient to insure satisfactory reliability of the sintered silicon nitride for use in applications such as automotive engine parts and bearings. The method comprises preparing a sintering aid by blending yttrium oxide, spinel, and aluminum oxide and/or aluminum nitride together in such proportions in terms of molar ratios of metal elements that Y/(Al+Mg) is 0.23 to 0.85 and Al/Mg is 2.1 to 5.2, mixing 5.0 to 13.0% by weight of the sintering aid with 87.0 to 95.0% by weight of a silicon nitride powder having an $\alpha$ crystallinity of not less than 60%, and, after the resulting powder mixture is molded into shape, sintering the molded piece at temperatures of 1400 to 1650° C. in a nitrogen gas atmosphere or in an inert gas atmosphere containing nitrogen gas.

6 Claims, No Drawings

METHOD OF PRODUCING SINTERED SILICON NITRIDES

BACKGROUND OF THE INVENTION

1. Field of the Invention

The present invention relates to a method of producing sintered silicon nitrides and, more particularly, to a method of producing a high-strength, sintered silicon nitride suitable for use in applications such as automotive engine parts and bearings.

2. Description of the Prior Art

Sintered silicon nitrides have high strength in both room and high temperature conditions, and other excellent properties, such as heat resistance, heat impact resistance, and corrosion resistance. For this reason, large expectations are entertained with sintered silicon nitrides for use in applications such as automotive engine parts and gas turbine components, and such material has already been in practical use in some applications, such as turbo chargers. Further, sintered silicon nitrides are lighter in weight and more resistant to wear than metallic materials, and because of this fact they are receiving attention for their use as sliding wear resistant materials. Actually, entry of sintered silicon nitrides into application areas including automotive parts, such as piston rings and valves, and machine parts, such as bearings, is under way.

Primarily, silicon nitride ($Si_3N_4$) is difficult to sinter, which fact makes it impracticable to sinter the material with itself alone. Conventionally, therefore, sintering aids such as Yttrium oxide ($Y_2O_3$), aluminum oxide ($Al_2O_3$), magnesium oxide (MgO), and spinel ($MgAl_2O_4$), are added in sintering the silicon nitride. In the course of sintering, a liquid phase is formed between the $Si_3N_4$ powder and the sintering aids, and $Si_3N_4$ powder is dissolved in the liquid phase to precipitate as fine crystalline phase. It has been considered that a microstructure of a sintered material is formed through such a dissolution/precipitation mechanism. Therefore, the microstructure of a sintered material varies and, at same time, characteristics of the sintered material also vary according to the ingredients, composition, and amount of addition of sintering aids.

As such, attention has hitherto been directed to the selection of sintering aids in order to improve mechanical properties of sintered silicon nitrides. One typical method for improving the strength characteristics of sintered silicon nitrides through selection of sintering aids is disclosed in, for example, Japanese Patent Laid-Open Publication SHO 59-131579, wherein a powder mixture including 70 to 94% by weight of silicon nitride, and not less than 2% by weight of yttrium oxide and not less than 2% by weight of spinel, the last two mentioned items totaling 6 to 30% by weight, is molded, the molded piece being then sintered at temperatures of 1650 to 1800° C. in a non-oxidizing atmosphere. In this publication it is stated that sintered materials having a bending strength of 794 to 931MPa (81 to 95 kgf/mm$^2$) were obtained according to the method.

In Japanese Patent Laid-Open Publication HEI 4-77363 there is described a method wherein 91.5 to 96.99% by weight of silicon nitride powder, 3 to 8% by weight of rare earth element oxide powder, and 0.01 to 0.5% by weight of spinel powder are mixed together, and the mixture is molded into shape, the molded piece being then sintered at atmospheric pressure in a non-oxidizing atmosphere and at temperatures of 1700° to 1850° C. The publication states that a sintered material having good strength characteristics at high temperatures can be obtained according to the method. The four-point bending strength disclosed therein is within the range of 800 to 1035 MPa (81.6 to 105.6 kgf/mm$^2$) at room temperature, and within the range of 600 to 765 MPa (61.2 to 78.0 kgf/mm$^2$) at 1300° C.

According to the prior art practice represented by the foregoing two methods, however, the 4-point bending strength of sintered silicon nitrides is of the order of 980 MPa (100 kgf/mm$^2$) at best. Therefore, when considering applications, such as automotive valve trains and high-speed bearings, which are likely subject to extra large stress and/or impact at sliding with the other parts, such a level of strength characteristics is still far from being said to be sufficient.

SUMMARY OF THE INVENTION

In view of such situation of the prior art, it is an object of the present invention to provide a method of producing a sintered silicon nitride having such strength characteristics as are sufficient to insure satisfactory reliability of the sintered silicon nitride for use in the form of mechanical parts such as automotive engine parts and bearings.

In order to accomplish the above object, according to the present invention there is provided a method of producing a sintered silicon nitride which comprises preparing a sintering aid by blending yttrium oxide, spinel, and aluminum oxide and/or aluminum nitride together in such proportions in terms of molar ratios of metal elements that Y/(Al+Mg) is 0.23 to 0.85:1 and Al/Mg is 2.1 to 5.2:1, mixing 5.0 to 13.0% by weight of the sintering aid with 87.0 to 95.0% by weight of a silicon nitride powder having an α crystallinity of not less than 60%, and, after the resulting powder mixture is molded into shape, sintering the molded piece at temperatures of 1400° to 1650° C. in a nitrogen gas atmosphere or in an inert gas atmosphere containing nitrogen gas.

When considering the strength of a sintered silicon nitride, first of all, reference should be had to the theory of Griffith, a fundamental concept regarding the fracture of brittle materials. According to this theory, fracture strength $\sigma_f$ of a sintered material is expressed by the following equation (Equation 1):

$$\sigma_f = E \cdot \gamma_s / 4a \tag{1}$$

(where, E: Young's modulus; $\gamma_s$: fracture surface energy; and a: latent crack length) In the equation, it is assumed that $\gamma_s$ and a depend on grain size and grain packed density if factors contributed by unavoidable defects in processing are excluded. Therefore, by reducing grain size and improving the packed density of grains, it is possible to expect an increase in value $\gamma_s$ and a decrease in value a, and this process improves strength of the sintered material.

In the course of silicon nitride being sintered, phase transformation of $Si_3N_4$ grains occurs at temperatures of 1400° C. and above, from a low-temperature stabilized α-phase to a high-temperature stabilized β-phase, and as crystal growth progresses, contraction occurs and simultaneously densification progresses. As the sintering temperature becomes higher, crystal grain size is coarser through crystal growth. In order to obtain a dense sintered material having fine and uniform grains, therefore, it is important to allow densification to progress fully prior to crystal phase transformation from $\alpha$-phase to $\beta$-phase, and at same time to control final sintering temperatures reasonably low.

Then, let consider the actions of sintering aids. Spinel ($MgAl_2O_4$) has the effect of accelerating densification of a sintered material prior to the phase transformation of silicon nitride. A similar action is recognized with magnesium oxide (MgO). It is considered from this fact that the presence of Mg as a component of the sintering aid leads to achievement of such effect. However, MgO is liable to volatilize during the process of sintering in which high vapor pressure is present, and it is known that when volatilization of MgO occurs, sintered material production involves increased strength variances and further that the volatilization is a cause of surface deterioration. Where $MgAl_2O_4$ is used as a sintering aid, similar problems occur because MgO is liberated by heating.

In contrast to this, according to the method of the invention, either aluminum oxide ($Al_2O_3$) or aluminum nitride (AlN), or both of them are present together with spinel ($MgAl_2O_4$), whereby the foregoing problem arising from MgO volatilization has been eliminated. The reason why addition of $Al_2O_3$ or AlN can prevent the liberation and volatilization of MgO is not clear, but presumably an increase in the amount of Al may lead to stabilization of $MgAl_2O_4$. It is noted, however, that where the molar ratio of Al to Mg, of metal elements in the sintering aid is less than 2.1:1, liberation and volatilization of MgO cannot be prevented, with the result that the product of the sintering operation involves considerable strength variances and surface deterioration. Where the molar ratio is more than 5.2:1, coarse grain precipitation occurs, with the result that the strength characteristics of sintered material produced is reduced.

Yttrium oxide ($Y_2O_3$), as a sintering aid, has the effect of increasing the aspect ratio of columnar crystals of $\beta$ silicon nitride produced by crystal transformation and thus contributes to improving the strength characteristics of the sintered material produced. However, when $Y_2O_3$ is used alone as a sintering aid, the sinterability is low and this necessitates the use of higher sintering temperatures. Unfortunately, the use of higher sintering temperatures leads to grain coarsening, which fact constitutes a major cause of the formation of a lower-strength sintered material.

In view of this problem, according to the method of the present invention, $MgAl_2O_4$, and $Al_2O_3$ and/or AlN are present together with $Y_2O_3$, all as sintering aid ingredients, to lower the temperature of liquid-phase formation. Thus, it has now become possible to allow $Y_2O_3$ to act as such in the process of low-temperature sintering. It is to be noted, however, that if the molar ratio of metal elements, Y to Al and Mg, in the sintering aid, i.e., Y/(Al+Mg), is more than 0.85:1, the proportion of $Y_2O_3$ is excessively large, so that the sinterability is lowered, it being thus difficult to achieve satisfactory densification. Where the molar ratio, or Y/(Ai+Mg), is less than 0.23:1, a densified structure may be obtained, but formation of columnar crystals is insufficient, with the result that the sintered material is of lower strength.

In this way, according to the method of the invention, the ingredients, composition, and proportion of the sintering aid are controlled, whereby in a much lower sintering temperature range of 1400° to 1650° C., as compared with that used in the conventional art, can be obtained a sintered material having a high grain density (high density) with a structure formed of fine and uniform crystal grains. Thus, the sintered material produced according to the method is of exceedingly high strength that has not been attainable in the conventional art. It is noted in this conjunction that if the sintering temperature is lower than 1400° C., sintering does not satisfactorily progress. If the sintering temperature is higher than 1650° C., coarse grain precipitations and sintering aid volatilization abruptly occur to lower the strength of a sintered material. For the selection of sintering temperatures, preferably the material being sintered is first subjected to sufficient contraction by sintering at temperatures of 1400° to 1500° C. and is then allowed to undergo grain transformation through sintering at temperatures of 1500° to 1650° C. for formation of a fine grained structure. Through this process is it possible to obtain a sintered material having much higher strength characteristics.

The sintering atmosphere used in the invention is a nitrogen atmosphere or an inert atmosphere containing nitrogen as in the conventional practice. However, the fact that the sintering temperature is considerably lower than 1800° C. which is a decomposition temperature of silicon nitride eliminates the need for pressurization of the atmosphere which has hitherto been used for preventing silicon nitride from becoming decomposed. According to the method of the invention, the sintering atmosphere need not always be pressurized, and even when the sintering atmosphere is of atmospheric pressure or a pressure range close to atmospheric pressure, such as 1.0 to 1.1 atmospheres, it is possible to produce a sintered silicon nitride having high strength characteristics.

Referring next to raw material powder or silicon nitride ($Si_3N_4$) powder, for purposes of sinterability enhancement, such a powder having an a crystallinity of not less than 60%, preferably not less than 70%, is used. If the a crystallinity is less than 60%, the sinterability obtainable is rather low and, in addition, when the sintering temperature is raised, there will occur heterogeneous growth of $\beta$ crystals, which result in a decrease in the strength of the product. It is noted that generally the higher the $\alpha$ crystallinity of the silicon nitride powder, the more strict control is required of temperatures in the stage of crystallization in silicon nitride powder manufacturing, which fact tends to lower productivity and increase production cost. When considering the cost factor in industrial production, therefore, it is desirable to use a silicon nitride powder having $\alpha$ crystallinity of about 70 to 95%.

The mixing proportions of silicon nitride powder and the above described sintering aid are: 87.0 to 95.0% by weight, preferably 89.0 to 93.0% by weight, of silicon nitride powder; and 5.0 to 13.0% by weight, preferably 7.0 to 11.0% by weight, of sintering aid. If the proportion of the sintering aid is less than 5.0% by weight, a highly densified sintered material cannot be obtained, while if that proportion is more than 13.0% by weight, the proportion of the grain boundary phase is excessive, which results in a decrease in the strength of the sintered material.

There is no particular limitation as to the method of mixing silicon nitride powder and sintering aids, as well as the method of molding. The ingredients may be dry- or wet-mixed in conventional manner, and the mixed powder may be molded into shape by pressing, CIP molding, injection molding, or casting. Preferably, wet-mixed slurry is directly molded by pressure-casting as it is. This is advantageous in that the process is simplified and in that a highly densified molding can be obtained.

In wet mixing in particular, silicon nitride powder and the sintering aid are mixed together using water as a solvent, and an alkaline or acid material is added to adjust the pH of the mixed slurry to 8.0 or above, preferably 8.5 or above. This pH adjustment results in considerable improvement in the dispersibility of powder, it being thus possible to obtain a very uniform powder mixture. If the pH is less than 8.0, powder in slurry tend to agglomerate and, therefore, the dispersibility of powder in slurry is poor. It is noted in this conjunction that even when the pH is adjusted to 8.0 or above, if the average particle size is more than 1.0 $\mu$m, a heterogeneous distribution of the sintering aid may occur. Therefore, it is preferable to use a silicon nitride powder having an average particle size of not more than 1.0 $\mu$m.

According to the method of the present invention, a molded piece prepared via mixing and molding stages as above described is sintered in a nitrogen atmosphere or an inert gas atmosphere containing nitrogen gas and at temperatures of 1400° to 1650° C. The resulting sintered material may be further subjected to secondary sintering in a nitrogen gas atmosphere of not less than 10 atmospheres and at temperatures of 1400° to 1650° C. so that a relative density of not less than 99% may be obtained. Through this secondary sintering is it possible to obtain a sintered material having further improved strength characteristics and less strength variances. It is to be noted that if the secondary sintering temperature is less than 1400° C., or if the pressure of the nitrogen gas atmosphere is lower than 10 atmospheres, or if the relative density at the post-secondary sintering stage is lower than 99%, no sufficient effect of the secondary sintering can be obtained. If the secondary sintering temperature is more than 1650° C., a grain coarsening tendency becomes pronounced, resulting in lowered strength characteristics and increased strength variances.

DETAILED DESCRIPTION OF THE PREFERRED EMBODIMENTS

EXAMPLE 1

To $Si_3N_4$ powder having a mean particle diameter of 0.5 $\mu$m and an a crystallinity of 95% were added, as sintering aid ingredients, $Y_2O_3$ powder having a mean particle diameter of 0.7 $\mu$m, $Al_2O_3$ powder having a mean particle diameter of 0.3 $\mu$m, AlN powder having a mean particle diameter of 0.8 $\mu$m, and $MgAl_2O_4$ powder having a mean particle diameter of 0.6 $\mu$m, according to the compositions shown in Table 1 below.

TABLE 1

| Sample No. | Powder composition (wt %) | | | | | Met. ele. molar ratio | |
|---|---|---|---|---|---|---|---|
| | $Si_3N_4$ | $Y_2O_3$ | $MgAl_2O_4$ | $Al_2O_3$ | AlN | Y/Al + Mg | Al/Mg |
| 1 | 91.0 | 3.4 | 4.9 | 0.7 | — | 0.26:1 | 2.4:1 |
| 2 | 91.0 | 4.2 | 4.2 | 0.6 | — | 0.37:1 | 2.4:1 |
| 3 | 91.0 | 5.0 | 3.5 | 0.5 | — | 0.53:1 | 2.4:1 |
| 4 | 91.0 | 5.5 | 3.0 | 0.4 | 0.1 | 0.66:1 | 2.5:1 |
| 5 | 91.0 | 5.8 | 2.8 | 0.4 | — | 0.77:1 | 2.4:1 |
| 6 | 91.0 | 5.0 | 3.8 | 0.2 | — | 0.53:1 | 2.2:1 |
| 7 | 91.0 | 5.0 | 2.5 | 1.5 | — | 0.54:1 | 3.7:1 |
| 8 | 91.0 | 5.0 | 2.5 | 0.5 | 1.0 | 0.51:1 | 4.0:1 |
| 9 | 91.0 | 5.0 | 2.0 | 2.0 | — | 0.54:1 | 4.8:1 |
| 10 | 89.0 | 6.1 | 4.3 | 0.6 | — | 0.53:1 | 2.4:1 |
| 11 | 93.0 | 3.9 | 2.7 | 0.4 | — | 0.53:1 | 2.4:1 |
| 12* | 91.0 | 2.6 | 5.6 | 0.8 | — | 0.17:1 | 2.4:1 |
| 13* | 91.0 | 6.6 | 2.1 | 0.3 | — | 0.17:1 | 2.4:1 |
| 14* | 91.0 | 5.0 | 4.0 | — | — | 0.53:1 | 2.0:1 |
| 15* | 91.0 | 5.0 | 1.8 | 2.2 | — | 0.55:1 | 5.4:1 |
| 16* | 91.0 | 5.0 | 1.2 | 2.2 | 0.6 | 0.53:1 | 8.9:1 |
| 17* | 85.0 | 8.3 | 5.9 | 0.7 | 0.1 | 0.52:1 | 2.4:1 |
| 18* | 96.0 | 2.2 | 1.6 | 0.2 | — | 0.52:1 | 2.3:1 |

(Note) Sample Nos. bearing an asterisk represent reference examples.

To each powder mixture of $Si_3N_4$ and sintering aid prepared according to the corresponding composition in Table 1 was added demineralized water for wet mixing in such a way that the concentration of the powder is 30% by volume. Then, to the mixture were added an ammonium polycarboxylate-based deflocculant and an acrylic binder, each in the amount of 0.5% by weight relative to the total powder weight. The pH of the mixture thus obtained was adjusted with ammonia to 9.5. Thereafter, the mixture was agitated by a nylon-made ball mill at 100 rpm for 24 hours.

Each slurry mixture obtained was molded into shape by pressure casting under a pressure of 30 kg/cm², a molded piece being thus prepared. The molded piece, after being dried and degreased, was sintered in a nitrogen gas atmosphere of 1 atmosphere at 1450° C. for 5 hours and, in continuation, at 1550° C. for 3 hours. The resulting sintered material was subjected to secondary sintering in a nitrogen gas atmosphere of 1000 atmospheres at 1600° C. for 1 hour.

From respective sintered materials obtained in this way were cut test specimens of 3×4×4mm conforming to JIS R-1601. Each specimen was subjected to grinding by a diamond grinding wheel of #800 and then to lapping by diamond lapping compound of #3000 for tensile test surfacing. For each sample, 15 specimens were tested as to 4-point bending strength at room temperature. Measurement results for respective samples are shown in Table 2 below, including measurements as to 4-point bending strength (mean value), Weibull's coefficient that expresses the distribution of strength variances, relative density of sintered material, and relative density of secondary sintered material.

TABLE 2

| Sample No. | Sintered material rel. density (%) | Sec. sintered material rel. density (%) | 4-pt bending strength (kgf/mm²) | Weibull's coef. |
|---|---|---|---|---|
| 1 | 98.2 | 100 | 144.3 | 20.5 |
| 2 | 98.0 | 100 | 152.3 | 23.9 |
| 3 | 98.0 | 100 | 159.3 | 24.1 |
| 4 | 97.6 | 99.6 | 153.9 | 24.2 |
| 5 | 97.0 | 99.0 | 143.5 | 21.8 |
| 6 | 98.1 | 100 | 154.8 | 23.6 |
| 7 | 97.6 | 99.8 | 151.3 | 23.1 |
| 8 | 97.8 | 100 | 153.4 | 21.7 |
| 9 | 97.3 | 99.5 | 143.8 | 20.3 |
| 10 | 98.5 | 100 | 150.2 | 22.8 |
| 11* | 96.3 | 99.1 | 142.2 | 21.6 |
| 12* | 98.5 | 100 | 100.3 | 16.2 |
| 13* | 94.4 | 95.2 | 82.7 | 10.4 |
| 14* | 98.0 | 99.3 | 103.6 | 14.5 |
| 15* | 97.0 | 99.0 | 100.1 | 15.6 |
| 16* | 96.5 | 99.0 | 98.2 | 13.2 |
| 17* | 98.9 | 100 | 104.9 | 16.6 |
| 18* | 93.7 | 94.0 | 78.5 | 12.1 |

(Note) Sample Nos. bearing an asterisk represent reference examples.

It can be seen from Table 2 that where ingredients and composition of sintering aid, and molar ratios of metal elements: Y/(Al+Mg) and Al/Mg, in the sintering aid are within the scope of the invention, sintered materials having particularly good strength characteristics can be obtained. It is noted that the greater the value of Weibull's coefficient, the smaller is the degree of strength variances.

EXAMPLE 2

A powder mixture prepared according to the composition of Sample No. 3 in Table 1 of Example 1 was molded into shape in the same manner as in Example 1. These molded pieces were sintered in a nitrogen gas atmosphere and under different conditions shown in Table 3. Some of the sintered materials thus obtained were further subjected to secondary sintering under the conditions shown in Table 3.

TABLE 3

| Sample No. | Sintering condition press. | Sintering condition temp. × hour | Sec. sintering condition press. | Sec. sintering condition temp. × hour |
|---|---|---|---|---|
| 3a | 1 atm | 1450° C. × 4 hr + 1630° C. × 3 hr | — | — |
| 3b | do. | do. | 100 atm | 1650° C. × 1 hr |
| 3c | do. | do. | 6 atm | do. |
| 3d | 5 atm | do. | — | — |
| 3e* | 1 atm | 1450° C. × 4 hr + 1700° C. × 3 hr | — | — |
| 3f* | do. | 1350° C. × 7 hr | — | — |

(Note) Sample Nos. bearing an asterisk represent reference examples.

Respective sintered materials were evaluated in the same manner as in Example 1, the results of which are shown in Table 4. It can be seen from Table 4 that sintered materials having excellent strength characteristics can be obtained in accordance with the sintering conditions of the invention, and that secondary sintering under pressure conditions of not less than 10 atmospheres can further improve the strength characteristics of such sintered material and also reduce strength variances.

TABLE 4

| Sample No. | Sintered material rel. density (%) | Sec. sintered material rel. density (%) | 4-pt bending strength (kgf/mm$^2$) | Weibull's coef. |
|---|---|---|---|---|
| 3a | 98.9 | — | 135.7 | 21.5 |
| 3b | 98.9 | 100 | 156.2 | 24.8 |
| 3c | 98.9 | 98.9 | 136.8 | 21.8 |
| 3d | 98.9 | — | 135.2 | 21.6 |
| 3e* | 99.3 | — | 105.4 | 12.3 |
| 3f* | 92.3 | — | 50.4 | 11.0 |

(Note) Sample Nos. bearing an asterisk represent reference examples.

Specimens of Sample No. 3b were tested for measurement of 4-point bending strength at elevated temperatures. Measurements showed 110 kgf/mm$^2$ at 1000° C. and 105 kgf/mm$^2$ at 1200° C. These values are higher than strength values at elevated temperatures known with respect to conventional sintered silicon nitrides.

EXAMPLE 3

Demineralized water was added to powder mixtures prepared according to the compositions of Sample Nos. 3, 7 and 10 in Table 1 of Example 1, and wet mixing was carried out in the same manner as in Example 1, except that the pH of each slurry mixture was adjusted with ammonia and a hydrochloric aqueous acid solution to the varying values shown in Table 5. Respective slurries, after being deaerated, were tested for viscosity measurement and were evaluated as to their state of powder dispersion. Also, respective slurries were molded into shape by pressure casting under the pressure of 30 kg/cm$^2$. Resulting molded pieces, after dried and degreased, were measured as to relative density. The measurement results are shown in Table 5.

TABLE 5

| Sample No. | pH of mixed slurry | | | | |
|---|---|---|---|---|---|
| | 5.0 | 7.0 | 8.0 | 8.5 | 9.5 |
| | Slurry viscosity (CP) | | | | |
| 3 | 2300 | 1560 | 300 | 65 | 55 |
| 7 | 2450 | 1650 | 350 | 80 | 60 |
| 10 | 2000 | 1400 | 220 | 55 | 50 |
| | Relative density of molded piece (%) | | | | |
| 3 | 47.0 | 47.9 | 51.3 | 52.5 | 52.6 |
| 7 | 47.1 | 47.8 | 51.0 | 52.4 | 52.3 |
| 10 | 48.3 | 48.8 | 52.0 | 52.4 | 52.5 |

It can be understood from Table 5 that wet mixing, with pH of mixed slurry adjusted to not lower than 8.0, results in improved dispersibility of mixed powder which in turn results in considerable decrease in slurry viscosity and, therefore, that the slurry can be molded into a high density molded piece by casting. Also, it may be appreciated that the effect of such viscosity decrease and high densification can be further enhanced by adjusting the pH to 8.5 or above.

EXAMPLE 4

Si$_3$N$_4$ powders having a mean particle diameter of 0.5 μm and different a crystallinities shown in Table 6 are used together with various sintering aids including Y$_2$O$_3$ powder having a mean particle diameter of 0.7 μm, Al$_2$O$_3$ powder having a mean particle diameter of 0.3 μm, MgAl$_2$O$_4$ powder having a mean particle diameter of 0.6 μm.

TABLE 6

| Si$_3$N$_4$ powder | A | B | C | D | E | F |
|---|---|---|---|---|---|---|
| α crystallinity (%) | 88 | 72 | 63 | 54 | 38 | 0 |

91.0% by weight of each of the above varieties of Si$_3$N$_4$ powder and, as sintering aid ingredients, 5.1% by weight of Y$_2$O$_3$ powder, 0.4% by weight of Al$_2$O$_3$ powder, and 3.5% by weight of MgAl$_2$O$_4$ powder were mixed together, and mixing, molding, sintering and secondary sintering operations were carried out with the mixed powder in the same way as in Example 1. The molar ratios of metal elements in the sintering assistant ingredients were: Y/(Al+Mg)=0.55 and Al/Mg=2.3. Individual sintered materials were evaluated in the same manner as in Example 1. The results are shown in Table 7.

TABLE 7

| Sample No. | Sintered material rel. density (%) | Sec. sintered material rel. density (%) | 4-pt bending strength (kgf/mm$^2$) | Weibull's coef. |
|---|---|---|---|---|
| A | 98.1 | 100 | 157.6 | 24.9 |
| B | 98.0 | 100 | 158.9 | 25.5 |
| C | 96.7 | 99.0 | 143.8 | 20.3 |
| D* | 95.5 | 97.3 | 89.0 | 10.4 |
| E* | 91.0 | 93.2 | 51.3 | 9.5 |
| F* | 78.3 | 79.0 | 20.0 | 9.7 |

(Note) Sample Nos. bearing an asterisk represent reference examples.

It can be seen from Table 7 that each sintered material using, as raw material powder, $Si_3N_4$ powder having an α crystallinity of not less than 60% has exceedingly high bending strength and less strength variances.

According to the present invention, it is possible to advantageously produce sintered silicon nitrides having much higher strength characteristics and less strength variances, which are therefore highly reliable, as compared to prior art sintered silicon nitrides. Therefore, sintered silicon nitrides according to the invention are suited for use in applications, such as component of automotive engine valve trains and machine component bearings.

What is claimed is:

1. A method of producing a sintered silicon nitride which comprises preparing a sintering aid by blending yttrium oxide, spinel, and aluminum oxide and/or aluminum nitride together in such proportions in terms of molar ratios of metal elements that Y/(Al+Mg) is 0.23 to 0.85:1 and Al/Mg is 2.1 to 5.2:1 mixing 5.0 to 13.0% by weight of the sintering aid with 87.0 to 95.0% by weight of a silicon nitride powder having an α crystallinity of not less than 60%, and, after the resulting powder mixture is molded into a molded piece, sintering the molded piece at temperatures of 1400 to 1650° C. in a nitrogen gas atmosphere or in an inert gas atmosphere containing nitrogen gas.

2. A method of producing a sintered silicon nitride as set forth in claim 1, wherein the silicon nitride powder has an α crystallinity of 70 to 95%.

3. A method of producing a sintered silicon nitride as set forth in claim 1 or 2, wherein the silicon nitride powder has a mean particle diameter of not more than 1.0 μm, and wherein the silicon nitride powder is wet-mixed with said sintering aid using water as a solvent and, in that conjunction, the pH of the resulting mixture slurry is adjusted to 8.0 or more.

4. A method of producing a sintered silicon nitride as set forth in claim 1 or 2, wherein the pressure of the nitrogen gas atmosphere or of the inert gas atmosphere containing nitrogen gas is of the atmospheric pressure level or within the range of 1.0 to 1.1 atmospheres.

5. A method of producing a sintered silicon nitride as set forth in claim 1 or 2, wherein in continuation to a sintering operation at temperatures of 1400° to 1500° C. in the stage of sintering, a further sintering operation is carried out at temperatures of 1500° to 1650° C.

6. A method of producing a sintered silicon nitride which comprises secondarily sintering the sintered material produced by the method defined in claim 1 or 2, in a nitrogen gas atmosphere of not less than 10 atmospheres and at temperatures of 1400° to 1650° C. in such a way as to achieve a relative density of not less than 99%.

* * * * *